(12) United States Patent
Zenzai et al.

(10) Patent No.: US 10,453,613 B2
(45) Date of Patent: Oct. 22, 2019

(54) CONDUCTIVE RESIN PASTE AND CERAMIC ELECTRONIC COMPONENT

(71) Applicant: Murata Manufacturing Co., Ltd., Nagaokakyo-shi, Kyoto-fu (JP)

(72) Inventors: Kota Zenzai, Nagaokakyo (JP); Yosuke Terashita, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 534 days.

(21) Appl. No.: 14/735,434

(22) Filed: Jun. 10, 2015

(65) Prior Publication Data

US 2015/0364256 A1    Dec. 17, 2015

(30) Foreign Application Priority Data

Jun. 16, 2014    (JP) .................................. 2014-123562

(51) Int. Cl.
*H01G 4/30* (2006.01)
*C09D 5/24* (2006.01)
*H01G 4/232* (2006.01)
*H01G 4/12* (2006.01)

(52) U.S. Cl.
CPC ................. *H01G 4/30* (2013.01); *C09D 5/24* (2013.01); *H01G 4/2325* (2013.01); *H01G 4/12* (2013.01)

(58) Field of Classification Search
CPC .......... H01G 4/30; H01G 4/248; H01G 4/232; H01G 4/008; H01G 4/2325; H01G 4/005; H01G 4/012; H01G 4/12; H01G 4/1227
See application file for complete search history.

(56) References Cited

U.S. PATENT DOCUMENTS

| | | | |
|---|---|---|---|
| 7,570,477 B2 | 8/2009 | Kayatani | |
| 7,976,735 B2* | 7/2011 | Akimoto | H01B 1/22 136/256 |
| 9,263,188 B2 | 2/2016 | Otani et al. | |
| 2009/0040688 A1* | 2/2009 | Kayatani | H01G 4/2325 361/321.1 |
| 2011/0095241 A1* | 4/2011 | Kong | C08G 59/4284 252/514 |
| 2011/0132637 A1 | 6/2011 | Otani et al. | |
| 2012/0103409 A1* | 5/2012 | Kim | B22F 1/0059 136/256 |
| 2012/0241203 A1* | 9/2012 | Kuwabara | B41M 1/10 174/257 |
| 2014/0178671 A1* | 6/2014 | Dreezen | C08G 59/184 428/323 |

(Continued)

FOREIGN PATENT DOCUMENTS

| | | |
|---|---|---|
| CN | 102146194 A | 8/2011 |
| JP | 2004063446 A | 2/2004 |
| JP | 2011-137218 A | 7/2011 |

(Continued)

*Primary Examiner* — Nguyen T Ha
(74) *Attorney, Agent, or Firm* — Arent Fox LLP

(57) ABSTRACT

A conductive resin paste that includes a conductive component and a resin component, where the conductive component includes at least Ag and Cu, and the proportion of the Ag to the total amount of the Ag and Cu included in the conductive component falls within the range of 11.6 mass % to 28.8 mass %. As the conductive component, an Ag-coated Cu powder is used which has a Cu powder with a surface at least partially coated with Ag.

20 Claims, 1 Drawing Sheet

(56) References Cited

U.S. PATENT DOCUMENTS

2017/0253750 A1* 9/2017 Okada ..................... C09C 3/06

FOREIGN PATENT DOCUMENTS

| JP | 2011214080 | * | 10/2011 |
| JP | 2011214080 | A | 10/2011 |
| JP | 2011-233452 | A | 11/2011 |
| JP | 4998467 | B2 | 8/2012 |
| JP | 5462984 | B1 | 4/2014 |
| WO | WO 2013/147235 | A1 | 10/2013 |

* cited by examiner

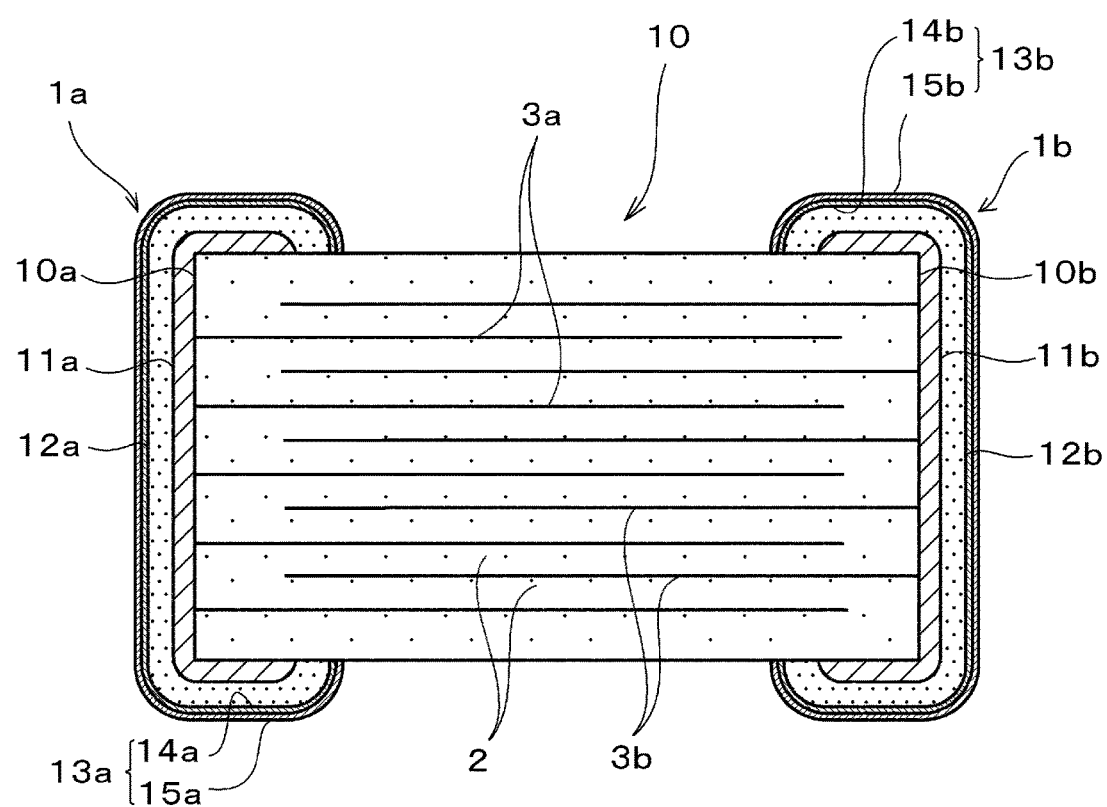

CONDUCTIVE RESIN PASTE AND CERAMIC ELECTRONIC COMPONENT

BACKGROUND OF THE INVENTION

Field of the Invention

The present invention relates to a conductive resin paste for the formation of a resin electrode layer for use in the manufacture of a ceramic electronic component where a ceramic body including internal electrodes is provided with an external electrode to be electrically connected the internal electrodes, and a ceramic electronic component with an external electrode formed with the use of the paste.

Description of the Related Art

Ceramic electronic components provided with external electrodes connected to internal electrodes provided within a ceramic body include ceramic electronic components provided with external electrodes each including a first conductor layer (for example, a base electrode) in direct conduction with internal electrodes, which is formed by applying and baking a conductive paste, and a second conductor layer (for example, a resin electrode layer) provided on the first conductor layer.

Furthermore, as a conductive paste for use in the formation of the second conductor layer of such an external electrode, a conductive paste (conductive resin paste) is proposed which includes (A) metal particles, (B) a thermosetting resin, and (C) rubber particles selected from the group consisting of silicone rubber particles and fluorine-containing rubber particles, where at least 70 mass % of the entire thermosetting resin (B) is a difunctional epoxy resin with an epoxy equivalent from 200 to 1500 (Japanese Patent Application Laid-Open No. 2011-233452).

Furthermore, Japanese Patent Application Laid-Open No. 2011-233452 discloses the adjustment of the constituent (C) from 1 μm to 6 μm in average particle size, the use of silver particles as the constituent (A), and further the use of, as the constituent (A), spherical silver particles and flake silver particles, where the ratio between the spherical silver particles and flake silver particles is adjusted to 30:70 to 70:30.

However, when ceramic electronic components (such as laminated ceramic capacitors, for example) with resin electrode layers (second conductor layers) formed with the use of the conventional conductive resin paste described above are used under high-temperature load environment, there is a possibility that silver migration will be caused to decrease the insulation resistance value between the electrodes, and cause short circuit in some cases.

Therefore, conductive resin pastes have been actually desired which are able to form further reliable resin electrode layers.

SUMMARY OF THE INVENTION

The present invention is intended to solve the problem mentioned above, and an object of the invention is to provide a conductive resin paste which is able to form resin electrode layers with a low rate of resistivity change over time without causing any conductive component to undergo migration, even when the paste is used under high-temperature environment, and a highly reliable ceramic electronic component including a resin electrode layer formed with the use of the paste.

In order to solve the problem, a conductive resin paste according to the present invention is:

a conductive resin paste that is used for forming a resin electrode layer of an external electrode including a base electrode and the resin electrode layer formed on the base electrode, the base electrode in direct conduction with an internal electrode and formed by applying a conductive paste to a ceramic body including the internal electrode and baking the conductive paste, the conductive resin paste including: a conductive component; and a resin component, in which the conductive component includes at least Ag and Cu, and the proportion of the Ag to the total amount of the Ag and Cu included in the conductive component falls within the range of 11.6 mass % to 28.8 mass %.

In the conductive resin paste according to the present invention, the conductive component preferably has an Ag-coated Cu powder comprising a Cu powder with a surface at least partially coated with Ag.

The use of, as the conductive component, the Ag-coated Cu powder comprising a Cu powder with a surface at least partially coated with Ag makes it possible to improve the oxidation resistance of the conductive component included in the resin electrode layer formed, thereby making the present invention more effective.

In addition, the Ag-coated Cu powder preferably includes Ag-coated Cu powders that differ in shape.

The use of, as the Ag-coated Cu powder, powders that differ in shape including, for example, spherical forms, flake shapes, and columnar forms makes it possible improve the oxidation resistance and conductivity of the conductive component included in the resin electrode layer formed.

In addition, the Ag-coated Cu powder preferably includes a spherical Ag-coated Cu powder and a flake Ag-coated Cu powder.

The use of, as the Ag-coated Cu powder, a powder including a spherical Ag-coated Cu powder and a flake Ag-coated Cu powder makes it possible to improve the oxidation resistance and conductivity of the conductive component included in the resin electrode layer formed, and can improve the plating adhesion of the resin electrode layer formed.

In addition, the Ag-coated Cu powder preferably includes two or more types of Ag-coated Cu powders that differ in ratio between Ag and Cu.

The use of, as the Ag-coated Cu powder, a powder including two or more types of Ag-coated Cu powders that differ in ratio between Ag and Cu makes it possible improve the oxidation resistance and conductivity of the conductive component included in the resin electrode layer formed.

Furthermore, a ceramic electronic component according to the present invention is:

a ceramic electronic component including:

a ceramic body including an internal electrode; and an external electrode including a base electrode and a resin electrode layer formed on the base electrode, the base electrode in direct conduction with the internal electrode and formed by applying a conductive paste to the ceramic body and baking the paste, where the resin electrode layer is formed with the use of the conductive resin paste according to the present invention.

The conductive resin paste according to the present invention includes the conductive component and the resin component, the conductive component includes at least Ag and Cu, and the proportion of the Ag to the total amount of the Ag and Cu included in the conductive component falls within the range of 11.6 mass % to 28.8 mass %. Thus, the formation of the resin electrode layer with the use of the conductive resin paste makes it possible to form a resin electrode layer with a low rate of resistivity change over time at high temperature while suppressing migration of Ag.

More specifically, the proportion of the Ag to the total amount of the Ag and Cu included in the conductive component is adjusted to 28.8 mass % or less to make it possible to prevent migration of Ag from being caused (on a level that can be visually confirmed), while the proportion of the Ag to the total amount of the Ag and Cu included in the conductive component is adjusted to 11.6 mass % or more to make it possible to prevent the rate of resistivity change over time at high temperature from being increased.

Furthermore, in the ceramic electronic component according to the present invention, which includes: a ceramic body including an internal electrode; an external electrode including a base electrode and a resin electrode layer formed on the base electrode, the base electrode in direct conduction with the internal electrode and formed by applying a conductive paste to the ceramic body and baking the conductive paste, the resin electrode layer is formed with the use of the above-described conductive resin paste according to the present invention. Thus, the invention makes it possible to provide a highly reliably ceramic electronic component including a resin electrode layer with a low rate of resistivity change over time at high temperature, with little migration of Ag.

BRIEF DESCRIPTION OF THE DRAWING

The FIGURE is a cross-sectional view illustrating the configuration of a ceramic electronic component (laminated ceramic capacitor) according to an embodiment of the present invention.

DETAILED DESCRIPTION OF THE INVENTION

With reference to embodiments of the present invention, features of the present invention will be described below in detail.

Embodiment 1

The FIGURE is a cross-sectional view schematically illustrating the configuration of a ceramic electronic component (in Embodiment 1, a laminated ceramic capacitor) including a resin electrode layer formed with the use of a conductive resin paste according to the present invention.

This laminated ceramic capacitor includes: a ceramic body 10; internal electrodes 3a, 3b stacked and provided with ceramic layers 2 interposed therebetween within the ceramic body 10, and alternately extracted to opposed end surfaces 10a, 10b of the ceramic body 10; and a pair of external electrodes 1a, 1b in conduction with the internal electrodes 3a, 3b.

Further, the external electrodes 1a, 1b include:
(a) base electrodes 11a, 11b formed on the end surfaces 10a, 10b of the ceramic body 10;
(b) resin electrode layers 12a, 12b formed on the base electrodes 11a, 11b; and
(c) plating metal layers 13a, 13b formed to coat the resin electrode layers 12a, 12b.

It is to be noted that the base electrodes 11a, 11b are electrodes formed by applying and baking a conductive paste including a conductive component and a binder, and in direct conduction with the internal electrodes 3a, 3b alternately extracted to the opposed end surfaces 10a, 10b of the ceramic body 10, without any other electrodes or the like interposed therebetween.

Furthermore, the resin electrode layers 12a, 12b are electrode layers including a conductive component and a resin component, which are formed by applying and curing the conductive resin paste mentioned above, and formed to coat the base electrodes 11a, 11b.

In addition, the plating metal layers 13a, 13b formed on the resin electrode layers 12a, 12b are formed for the purposes of ensuring conductivity, and providing solder wettability (solderability) to the external electrodes 1a, 1b, and in Embodiment 1 herein, the Ni plating metal layers 14a, 14b are formed as base layers, and Sn plating metal layers 15a, 15b are formed thereon.

Next, a method for manufacturing a ceramic electronic component (laminated ceramic capacitor) according to Embodiment 1 herein will be described.

[1] Preparation of Ceramic Electronic Component (1) First, the ceramic body 10 was prepared provided with the internal electrodes 3a, 3b. The ceramic body 10 can be prepared by degreasing and firing, under predetermined conditions, a stacked body formed in such a way that ceramic green sheets with internal electrode patterns printed are stacked and subjected to pressure bonding. However, the method for forming the ceramic body 10 is not particularly restricted.

In Embodiment 1 herein, a ceramic body that is high in rated voltage and likely to cause migration of Ag with the following conditions was prepared as the ceramic body 10.

(a) Dimensions: 1.6 mm in length, 0.8 mm in width, 0.8 mm in thickness
(b) Rated Voltage: 50 V
(c) Electrostatic Capacitance: 0.1 μF (2) Then, a conductive paste (Cu electrode paste) prepared by blending and kneading a Cu powder as a conductive component with a binder or the like was applied to the end surfaces 10a, 10b of the ceramic body 10, and baked to form the base electrodes 11a, 11b.

(3) Next, the following conductive resin paste was applied onto the base electrodes 11a, 11b, and the conductive resin paste was subjected to curing under the conditions of 180° C. to 230° C. and 10 min to 60 min to form the resin electrode layers 12a, 12b.

The conductive resin paste herein had:
(a) Epoxy Resin: bisphenol A epoxy resin: 10 mass %
(b) Phenolic Curing Agent: novolac-type phenolic resin: 1 mass %
(c) Conductive Component (Ag-coated Cu powder+Ag Powder): 69 mass %
(d) Curing Accelerator (imidazole compound): moderate amount
(e) Coupling Agent (silane coupling agent): moderate amount
(f) Solvent: diethylene glycol monobutylether: balance
blended and kneaded for use.

However, the following Ag-coated Cu powder and Ag powder were blended in proportions as shown in Table 1 for use as the conductive component.

<Ag-Coated Cu Powder>
An Ag-coated Cu powder in which the proportion of the Ag to the total amount of the Ag and Cu was 20.9 mass % was used which was spherical and 3 μm to 4 μm in average particle size $D_{50}$.

<Ag Powder>
An Ag powder was used which had a flake form and an average particle size $D_{50}$ of 2.6 μm.

(4) The ceramic body 10 with the base electrodes 11a, 11b and resin electrode layers 12a, 12b formed in the way described above was subjected to Ni plating and Sn plating to form, on the surfaces of the resin electrode layers 12a, 12b, the plating metal layers 13a, 13b including the Ni plating metal layers 14a, 14b and the Sn plating metal layers 15a, 15b. Thus, laminated ceramic capacitors (ceramic electronic components) according to sample numbers 1 to 5 in Table 1 were obtained which were structured as shown in the FIGURE.

It is to be noted that the samples (sample numbers 3, 4, and 5) of sample numbers marked with * in Table 1 refer to samples that fail to meet the requirements of the present invention.

[2] Evaluation of Characteristics

For the samples of sample numbers 1 to 5 in Table 1 (laminated ceramic capacitors configured as shown in the FIGURE, with the base electrodes, resin electrode layers, and plating metal layers formed), prepared in the way described above, the incidence of Ag migration was examined by the following method.

For evaluating the incidence of Ag migration, after the samples (laminated ceramic capacitors) were mounted on a substrate, and then subjected to treatment of applying a voltage of 70 V between the external electrodes and keeping the voltage for 500 h or 1000 h at 175° C., the incidence of migration at the surfaces of the samples was observed with a digital microscope, and the incidence rate of migration was calculated from the following formula (1) in conjunction with the relationship between the number of samples with Ag migration incidence observed and the number of samples evaluated. The results are shown together in Table 1.

Migration Incidence Rate (%)=(The Number of Samples with Ag Migration Incidence Observed/The Number of Samples Evaluated)×100 (1)

Furthermore, cross sections of the external electrodes were polished, and the Ag and Cu in the resin electrodes were quantitatively analyzed to obtain the proportion of the Ag to the total amount of the Ag and Cu included in the conductive component. The results are shown together in Table 1.

Moreover, for the respective conductive resin paste used for preparing the samples of sample numbers 1 to 5 in Table 1, the rate of resistivity change was obtained by the following method.

For obtaining the rate of resistivity change, the above-mentioned conductive resin pastes (the conductive resin pastes used for preparing the samples of sample numbers 1 to 5 in Table 1) were applied onto a glass slide plate to be approximately 20 cm in length, approximately 0.1 cm in width, and approximately 50 μm in height, thereby forming coating films, and the films were subjected to curing at a temperature of approximately 200° C.

Then, the cured coating films (cured products) were subjected to resistance measurement to obtain the resistivity. This resistivity was regarded as initial resistivity.

Then, after leaving the cured coating films (cured products) under the condition of 175° C. for 7 days (leaving at high temperature), the resistivity was obtained in the same way for the cured products. This was regarded as resistivity after leaving at high temperature.

The rate of resistivity change was obtained from the following formula (2) with the initial resistivity and the resistivity after leaving at high temperature.

Rate of Resistivity Change (%)={(Resistivity after Leaving at High Temperature−Initial Resistivity)/Initial Resistivity}×100 (2)

It is to be noted that this rate of resistivity change refers to such a characteristic that is determined as pass, for example, when the value of the rate is 900% or less.

For each conductive resin paste, Table 1 shows therein the values together for the rate of resistivity change examined in the way described above.

TABLE 1

| Sample Number | Ag-coated Cu powder:Ag Powder (mass ratio) | Ag Content in Conductive Component (mass %) | Migration Incidence Rate (%) After 500 hr | Migration Incidence Rate (%) After 1000 hr | Rate of Resistivity Change (%) |
|---|---|---|---|---|---|
| 1 | 100:0 | 20.9 | 0 | 0 | 42.2 |
| 2 | 90:10 | 28.8 | 0 | 0 | 41.1 |
| 3* | 80:20 | 36.7 | 17 | 22 | −0.752 |
| 4* | 60:40 | 52.5 | 56 | 83 | −36.5 |
| 5* | 0:100 | 100.0 | 50 | 83 | −57.5 |

The samples of sample numbers marked with * refer to samples that fail to meet the requirements of the present invention.

As shown in Table 1, it has been confirmed that migration of Ag is caused in the case of the samples of sample numbers 3, 4, and 5 (that is, the samples which fail to meet the requirements of the present invention, with an Ag proportion in excess of 28.8 mass %), where the proportion of the Ag to the total amount of the Ag and Cu included in the conductive component is 36.7 mass % or more.

In contrast, it has been confirmed that migration of Ag is not caused after a lapse of 500 hours, as well as even after a lapse of 1000 hours in the case of the samples of sample numbers 1 and 2 (the samples which meet the requirements of the present invention), where the proportion of the Ag to the total amount of the Ag and Cu included in the conductive component is 28.8 mass % or less.

In addition, it has been confirmed that the rate of resistivity change is 900% or less, which is not particularly problematic, in each case of the conductive resin pastes used in the samples of sample numbers 1 to 5.

Embodiment 2

In Embodiment 2 herein, samples of sample numbers 11 to 16 in Table 2 (laminated ceramic capacitors configured in the same manner as in Embodiment 1) were prepared in the same way and under the same condition as in the case of Embodiment 1 described above, except for the use of the conductive resin pastes described below.

It is to be noted that the samples (sample numbers 11, 12) of sample numbers marked with * in Table 2 refer to samples that fail to meet the requirements of the present invention.

<Composition of Conductive Resin Paste>

(a) Epoxy Resin: bisphenol A epoxy resin: 10 mass %

(b) Phenolic Curing Agent: novolac-type phenolic resin: 1 mass %

(c) Conductive Component (Ag-coated Cu powder): 69 mass %

(d) Curing Accelerator (imidazole compound): moderate amount (e) Coupling Agent (silane coupling agent): moderate amount (f) Solvent: diethylene glycol monobutylether: balance blended and kneaded for use.

However, as the conductive component, 6 types of spherical Ag-coated Cu powders of 1.1 μm in average particle size $D_{50}$ were used in which the proportion of the Ag to the total amount of the Ag and Cu was varied from 10.0 mass % (sample number 11) to 10.9 mass % (sample number 12), 11.6 mass % (sample number 13), 13.3 mass % (sample number 14), 15.0 mass % (sample number 15), and 19.7 mass % (sample number 16).

Then, the incidence of Ag migration was examined in the same way as in the case of Embodiment 1. The results are shown together in Table 2.

Furthermore, for cured products obtained by applying, onto a glass slide plate, the respective conductive resin pastes used in Embodiment 2 herein and curing the pastes in the same way as in the case of Embodiment 1, the rate of resistivity change was examined in the same way as in the case of Embodiment 1. The results are shown together in Table 2.

TABLE 2

| Sample Number | Ag Powder in Ag-coated Cu powder (mass ratio) | Ag Content in Conductive Component (mass %) | Migration Incidence Rate (%) After 500 hr | Migration Incidence Rate (%) After 1000 hr | Rate of Resistivity Change (%) |
|---|---|---|---|---|---|
| 11* | 10.0 | 10.0 | 0 | 0 | 1138 |
| 12* | 10.9 | 10.9 | 0 | 0 | 982 |
| 13 | 11.6 | 11.6 | 0 | 0 | 880 |
| 14 | 13.3 | 13.3 | 0 | 0 | 694 |
| 15 | 15.0 | 15.0 | 0 | 0 | 561 |
| 16 | 19.7 | 19.7 | 0 | 0 | 310 |

The samples of sample numbers marked with * refer to samples that fail to meet the requirements of the present invention.

As shown in Table 2, it has been confirmed that migration of Ag is not caused after a lapse of 500 hours, as well as even after a lapse of 1000 hours, in each case of the samples of sample numbers 11 to 16, including the samples which fail to meet the requirements of the present invention (the samples of sample numbers 11, 12), in which the proportion of the Ag to the total amount of the Ag and Cu included in the conductive component is 10.0 mass % and 10.9 mass %.

Furthermore, it has been confirmed that the rate of resistivity change falls within the range of 310% to 880%, which is not particularly problematic, in the case of the conductive resin pastes used in the samples of sample numbers 13 to 16 in Table 2 (the conductive resin pastes which meet the requirements of the present invention).

However, it has been confirmed that the rate of resistivity change is unfavorably high, which is 1138% and 982%, in the case of the conductive resin paste used in sample number 11 in which the proportion of the Ag to the total amount of the Ag and Cu included in the conductive component is 10.0 mass % and the conductive resin paste used in sample number 12 in which the proportion of the Ag to the total amount of the Ag and Cu is 10.9 mass % (the conductive resin pastes which fail to meet the requirements of the present invention).

Embodiment 3

In Embodiment 3 herein, samples of sample numbers 21 to 24 in Table 3 (laminated ceramic capacitors configured in the same manner as in Embodiment 1) were prepared in the same way and under the same condition as in the case of Embodiment 1 described above, except for the use of the conductive resin pastes described below.

<Composition of Conductive Resin Paste>
(a) Epoxy Resin: bisphenol A epoxy resin: 10 mass %
(b) Phenolic Curing Agent: novolac-type phenolic resin: 1 mass %
(c) Conductive Component (using Two Types of Ag-coated Cu powders blended): 69 mass %
(d) Curing Accelerator (imidazole compound): moderate amount
(e) Coupling Agent (silane coupling agent): moderate amount
(f) Solvent: diethylene glycol monobutylether: balance
blended and kneaded for use.

As the conductive component, the following a first Ag-coated Cu powder and a second Ag-coated Cu powder were blended for use in proportions as shown in Table 3.

<First Ag-Coated Cu Powder>

As the first Ag-coated Cu powder, a spherical Ag-coated Cu powder of 1.2 μm in average grain size $D_{50}$ was used in which the proportion of the Ag to the total amount of the Ag and Cu (Ag coating ratio) was 20.6 mass %.

<Second Ag-Coated Cu Powder>

As the second Ag-coated Cu powder, a flake Ag-coated Cu powder of 6.7 μm in average grain size $D_{50}$ was used in which the proportion of the Ag to the total amount of the Ag and Cu (Ag coating ratio) was 19.4 mass %.

In Embodiment 3 herein, the first Ag-coated Cu powder and the second Ag-coated Cu powder were blended for use in proportions of 100:0 (sample number 21), 70:30 (sample number 22), 60:40 (sample number 23), and 50:50 (sample number 24) in terms of mass ratio.

The respective samples (sample numbers 21 to 24) in Embodiment 3 herein are samples that meet the requirements of the present invention, in which the proportion of the Ag to the total amount of the Ag and Cu falls within the range of 20.0 mass % to 20.6 mass %.

For each sample of sample numbers 21 to 24, the incidence of Ag migration was examined in the same way as in the case of Embodiment 1. The results are shown together in Table 3.

Furthermore, for cured products obtained by applying, onto a glass slide plate, the conductive resin pastes used in Embodiment 3 and curing the pastes in the same way as in the case of Embodiment 1, the rate of resistivity change was examined in the same way as in the case of Embodiment 1. The results are shown together in Table 3.

TABLE 3

| Sample Number | Spherical Ag-coated Cu powder:Flake Ag-coated Cu Powder (mass ratio) | Ag Content in Conductive Component (mass %) | Migration Incidence Rate (%) After 500 hr | Migration Incidence Rate (%) After 1000 hr | Rate of Resistivity Change (%) |
|---|---|---|---|---|---|
| 21 | 100:0 | 20.6 | 0 | 0 | 215 |
| 22 | 70:30 | 20.2 | 0 | 0 | 167 |
| 23 | 60:40 | 20.1 | 0 | 0 | 158 |
| 24 | 50:50 | 20.0 | 0 | 0 | 153 |

As shown in Table 3, it has been confirmed that migration of Ag is not caused after a lapse of 500 hours, as well as even after a lapse of 1000 hours, in the case of the samples of sample numbers 22 to 24 in Table 3, with the first Ag-coated Cu powder and second Ag-coated Cu powder blended for use in the predetermined proportions.

In addition, it has been confirmed that migration of Ag is not caused either, in the case of the sample of sample number 21 in Table 3, obtained with the use of only the first Ag-coated Cu powder.

In addition, it has been confirmed that the rate of resistivity change falls within the range of 153% to 215%, which is not particularly problematic, in the case of the conductive resin pastes used in the samples of sample numbers 21 to 24 in Table 3.

It is to be noted that while the laminated ceramic capacitors have been described as examples in the above embodiments, the present invention is not limited to the laminated ceramic capacitor, but able to be applied to various ceramic electronic components that have an external electrode including a base electrode and a resin electrode layer.

The present invention is further not to be considered limited to the above embodiments either in other respects, but various applications and modifications can be made within the scope of the invention, regarding the types, etc. of the electrode material constituting the base electrode, and of the ceramic material constituting the ceramic body.

What is claimed is:

1. A conductive resin paste comprising:
   a conductive component; and
   a resin component, wherein
   the conductive component includes at least Ag and Cu, and
   a proportion of the Ag to a total amount of the Ag and Cu included in the conductive component is within a range of 11.6 mass % to 28.8 mass %.

2. The conductive resin paste according to claim 1, wherein the conductive component comprises an Ag-coated Cu powder.

3. The conductive resin paste according to claim 2, wherein the Ag-coated Cu powder comprises a Cu powder with a surface at least partially coated with Ag.

4. The conductive resin paste according to claim 3, wherein the Ag-coated Cu powder comprises Ag-coated Cu powders that differ in shape.

5. The conductive resin paste according to claim 4, wherein the Ag-coated Cu powder comprises a spherical Ag-coated Cu powder and a flake Ag-coated Cu powder.

6. The conductive resin paste according to claim 5, wherein the Ag-coated Cu powder comprises two or more types of Ag-coated Cu powders that differ in ratio between Ag and Cu.

7. The conductive resin paste according to claim 4, wherein the Ag-coated Cu powder comprises two or more types of Ag-coated Cu powders that differ in ratio between Ag and Cu.

8. The conductive resin paste according to claim 3, wherein the Ag-coated Cu powder comprises two or more types of Ag-coated Cu powders that differ in ratio between Ag and Cu.

9. The conductive resin paste according to claim 2, wherein the Ag-coated Cu powder comprises Ag-coated Cu powders that differ in shape.

10. The conductive resin paste according to claim 9, wherein the Ag-coated Cu powder comprises a spherical Ag-coated Cu powder and a flake Ag-coated Cu powder.

11. The conductive resin paste according to claim 10, wherein the Ag-coated Cu powder comprises two or more types of Ag-coated Cu powders that differ in ratio between Ag and Cu.

12. The conductive resin paste according to claim 9, wherein the Ag-coated Cu powder comprises two or more types of Ag-coated Cu powders that differ in ratio between Ag and Cu.

13. The conductive resin paste according to claim 2, wherein the Ag-coated Cu powder comprises a spherical Ag-coated Cu powder and a flake Ag-coated Cu powder.

14. The conductive resin paste according to claim 13, wherein the Ag-coated Cu powder comprises two or more types of Ag-coated Cu powders that differ in ratio between Ag and Cu.

15. The conductive resin paste according to claim 2, wherein the Ag-coated Cu powder comprises two or more types of Ag-coated Cu powders that differ in ratio between Ag and Cu.

16. A ceramic electronic component comprising:
    a ceramic body having an internal electrode; and
    an external electrode comprising a base electrode and a resin electrode layer on the base electrode, the base electrode being in direct conduction with the internal electrode and formed from baked a conductive paste,
    wherein the resin electrode layer is formed from the conductive resin paste according to claim 1.

17. The ceramic electronic component according to claim 16, wherein the resin electrode layer is the conductive resin paste in a cured state.

18. The ceramic electronic component according to claim 16, wherein the conductive component comprises an Ag-coated Cu powder.

19. The ceramic electronic component according to claim 18, wherein the Ag-coated Cu powder comprises a spherical Ag-coated Cu powder and a flake Ag-coated Cu powder.

20. The ceramic electronic component according to claim 18, wherein the Ag-coated Cu powder comprises Ag-coated Cu powders that differ in shape.

* * * * *